United States Patent
Schimper

(10) Patent No.: US 8,503,618 B2
(45) Date of Patent: Aug. 6, 2013

(54) EMERGENCY CALL SYSTEM BETWEEN A TELECOMMUNICATION DEVICE AND AN EMERGENCY CALL CENTER

(75) Inventor: Thomas Schimper, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1526 days.

(21) Appl. No.: 12/083,022

(22) PCT Filed: Aug. 31, 2006

(86) PCT No.: PCT/EP2006/008499
§ 371 (c)(1),
(2), (4) Date: Apr. 2, 2008

(87) PCT Pub. No.: WO2007/042107
PCT Pub. Date: Apr. 19, 2007

(65) Prior Publication Data
US 2009/0136007 A1    May 28, 2009

(30) Foreign Application Priority Data

Oct. 10, 2005 (DE) .......................... 10 2005 048 354

(51) Int. Cl.
*H04M 11/04* (2006.01)
(52) U.S. Cl.
USPC .......................... 379/45; 379/221.02; 370/352
(58) Field of Classification Search
USPC ........... 370/352; 379/45, 221.02; 455/404.1, 455/411
See application file for complete search history.

(56) References Cited

U.S. PATENT DOCUMENTS

| | | | | |
|---|---|---|---|---|
| 5,742,666 | A * | 4/1998 | Alpert | 455/404.2 |
| 6,775,534 | B2 * | 8/2004 | Lindgren et al. | 455/404.1 |
| 7,437,142 | B2 * | 10/2008 | Hurtta | 455/404.1 |
| 7,929,517 | B2 * | 4/2011 | Lin et al. | 370/352 |
| 2005/0018620 | A1 | 1/2005 | Berndt et al. | |
| 2006/0072547 | A1 * | 4/2006 | Florkey et al. | 370/352 |
| 2007/0058615 | A1 * | 3/2007 | Hasenfang et al. | 370/352 |

FOREIGN PATENT DOCUMENTS

| | | |
|---|---|---|
| GB | 2 361 389 A | 10/2001 |
| WO | WO 2004/095232 A2 | 11/2004 |
| WO | WO 2005/043878 A1 | 12/2005 |

OTHER PUBLICATIONS

Derwent Abstract—WO 2005/043878 A; May 12, 2005; Sanyo Electric Co, Ltd., Osaka, Japan.

* cited by examiner

*Primary Examiner* — Olisa Anwah
(74) *Attorney, Agent, or Firm* — Laurence A. Greenberg; Werner H. Stemer; Ralph E. Locher

(57) ABSTRACT

For implementing an emergency call system between a telecommunication device and an emergency call center, the telecommunication device includes a log-in and log-out state via a switchable log-in function at a VoIP telecommunication service provider via an IP infrastructure consisting of at least one router. The emergency call center has a public IP number via which, in the log-out state of the telecommunication device, an emergency call connection diverting to the VoIP telecommunication service provider is safeguarded between the telecommunication device and the emergency call center.

10 Claims, 1 Drawing Sheet

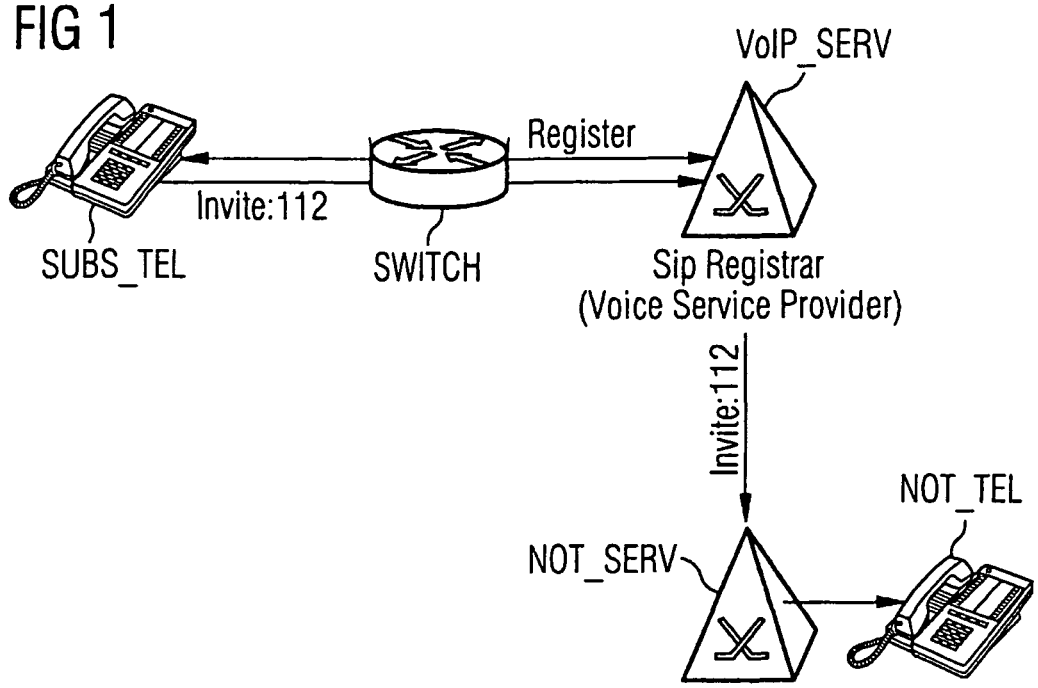
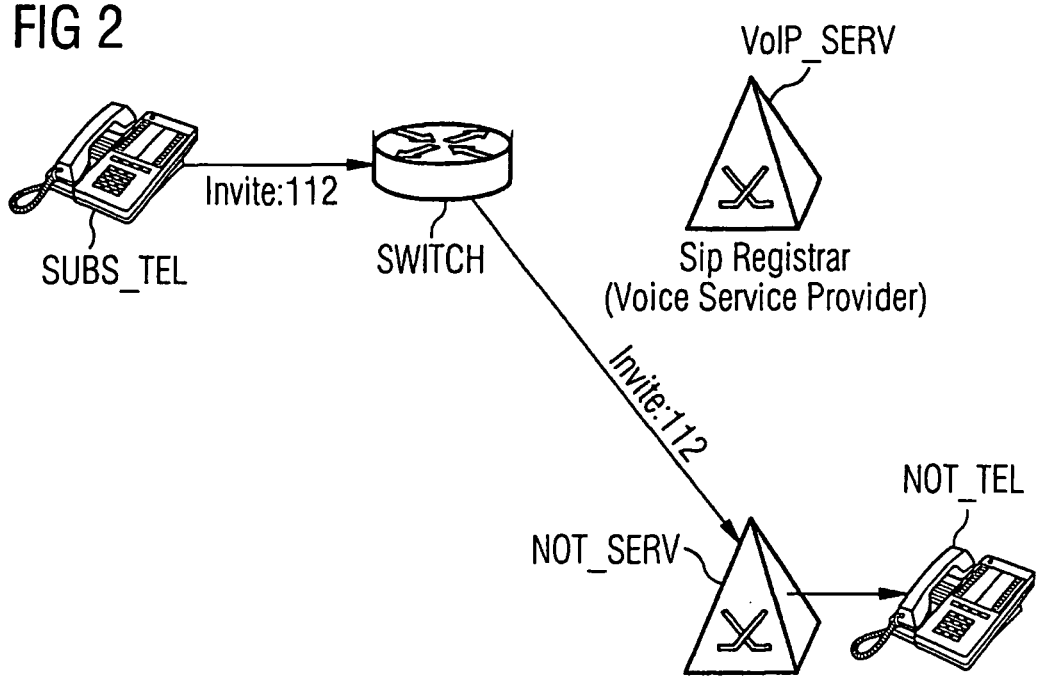

US 8,503,618 B2

EMERGENCY CALL SYSTEM BETWEEN A TELECOMMUNICATION DEVICE AND AN EMERGENCY CALL CENTER

CROSS-REFERENCE TO RELATED APPLICATIONS

The present application is a national stage application of International Application No. PCT/EP2006/008499, filed on Aug. 31, 2006, which claims priority to German Patent Application No. 10 2005 048 354.2, filed on Oct. 10, 2005, both of which are incorporated herein by reference.

BACKGROUND OF THE INVENTION

The invention relates to an emergency call system between a telecommunication device and an emergency call center as claimed in the preamble of claim 1.

In current VoIP (Voice over Internet Protocol) systems, registration or log-in can or must occur at a VoIP telecom service provider for a telecommunication device having IP (Internet Protocol) functions, preferably a telephone, a mobile device, a computer etc., before this service can be used. Depending on configuration or adjustment, a telephone, e.g., is permanently allocated to one account and requires log-in with identification with a password. In the further text, only the latter case is considered which is also the normal case for so-called soft clients (telecommunication devices).

A telephone which comprises a log-in or log-out function so that it requires log-in or log-out, respectively, for the telephone function, can also assume the "log-out state", in particular. In this state, the telephone cannot be used for making calls. It is virtually switched off.

A problem emerges if an emergency call is necessary during the log-out state. This is not possible then.

SUMMARY OF THE INVENTION

The invention is based on the object of specifying a permanent emergency call system between a telecommunication device and an emergency call center in which the telecommunication device has an operating state for a switchable log-in function at a VoIP telecommunication service provider. It is assumed that the telecommunication terminal is connected to an IP infrastructure (e.g. router). The emergency call is only possible when the IP infrastructure is intact.

Accordingly, one aspect involves an emergency call system between a telecommunication device and an emergency call center in which the telecommunication device includes a log-in and log-out state via a switchable log-in function at a VoIP telecommunication service provider via an IP infrastructure consisting of at least one router. The emergency call center has a public IP number via which, in the log-out state of the telecommunication device, an emergency call connection diverting to the VoIP telecommunication service provider is safeguarded between the telecommunication device and the emergency call center.

In this context, an emergency call system between a telecommunication device and an emergency call center is described in which the telecommunication device comprises an operating state or log-in and log-out states via a switchable log-in function at a VoIP telecommunication service provider via an IP infrastructure consisting of at least one router. In this arrangement, access to VoIP services is allowed to the telecommunication device registered at the VoIP telecommunication service provider via the switched log-in function (log-in state). The access is not possible when the log-in function is switched off (log-out state). Due to the fact that the emergency call center has a public IP number via which an emergency call connection diverting to the VoIP telecommunication service provider is safeguarded between the telecommunication device and the emergency call center when the log-in function is switched off (=log-out state) at the telecommunication device, an emergency call unregistered at the VoIP telecommunication service provider from the telecommunication device can be guaranteed, according to the invention, in spite of the log-out state. The diversion is implemented physically, e.g. at the router (=switch).

Advantageously, e.g. one or more national or world-wide emergency call center(s) can be introduced which accept anonymous emergency calls from unregistered or logged-out users. From the point of view of functionality, this is to be understood to be like that in current mobile radio networks (in contrast to a VoIP network) in which an emergency call is possible even without the SIM card being inserted in the mobile telephone.

In an emergency call server with the public IP number of the emergency center, access will thus take place without registration of the user. At the same time, this IP address should be available via IP networks by the IP infrastructure service provider, or diverted to a separate emergency call center of the VoIP telecommunication service provider.

Finally, the world-wide (or region-wide) public IP emergency call number can be entered into the telecommunication device or supplied with the device. Calls, e.g. to normally used emergency call telephone numbers "112", "110", "911" are always possible via the emergency call server, other telephone numbers are not.

Thus, in the logged-out state, the telecommunication device always uses the "address" of the emergency call server for switching calls to the emergency call telephone numbers. In the logged-in state, in contrast, access will take place via a normal server of the VoIP telecommunication service provider.

Advantageous embodiments of the invention are shown in the subclaims.

When receiving an emergency call coming from the telecommunication device, an IP number of the telecommunication device can also be stored in the emergency call center so that a call back from the emergency center to the telecommunication device can be initiated by means of the IP number of the telecommunication device.

Furthermore, with the log-in function switched on (=log-in state) at the telecommunication device, the emergency call connection diverting via the VoIP telecommunication service provider forms a connection to a connection existing via the VoIP telecommunication service provider.

BRIEF DESCRIPTION OF THE SEVERAL VIEWS OF THE DRAWINGS

In the text which follows, the invention will be explained in an exemplary embodiment, with reference to the drawings, in which:

FIG. 1 shows an emergency call system with a telecommunication device logged in at VoIP, FIG. 2 shows an emergency call system with a telecommunication device logged out at VoIP.

DETAILED DESCRIPTION OF THE INVENTION

FIG. 1 shows an emergency call system with a telecommunication device SUBS_TEL logged in at VoIP. In this context, the telecommunication device SUBS_TEL is a telephone with access to a VoIP server VoIP_SERV of a VoIP telecommunication service provider (Voice Service Provider). The telephone has here a switched-on (logged-in) log-in function (=log-in state) at the VoIP server. An emergency call (Invite: 112) is initiated from the telephone via the IP infrastructure and with existing and recognized registration (Register/Sip Registrar) at the VoIP server of the VoIP telecommunication service provider, the emergency call will be transmitted via the VoIP server to an emergency center or, respectively, an emergency service telephone connection NOT_TEL. In the present example, the emergency call center has an emergency server NOT_SERV which can comprise an IP address by means of which emergency calls from the VoIP server are recognized. Another connection such as a public communication network or a radio network between the VoIP server and the emergency center or the emergency service telephone connection could also be used.

FIG. 2 represents the emergency system according to FIG. 1 but the log-in function of the telephone SUBS_TEL is switched off (=log-out state) (logged out) at the VoIP telecommunication service provider. The connection between an IP infrastructure with, e.g., a router SWITCH and the VoIP server VoIP_SERV can thus be established. Since, according to the invention, the emergency call center has a public IP address for an Internet access to the emergency server NOT_SERV which is stored in the telephone for emergency calls (Invite: 112) and is now called up, a new connection can be established therefore between the telecommunication terminal via the IP infrastructure and the emergency server NOT_SERV or, respectively, the emergency service telephone connection NOT_TEL. This new emergency call connection diverts the connection via the VoIP server VoIP_SERV according to FIG. 1. In the invention, there can also be a call of the telecommunication terminal SUBS_TEL at the emergency call center without registration of the telecommunication terminal at the emergency call center.

The invention claimed is:

1. An emergency call system between a telecommunication device and an emergency call center in which the telecommunication device comprises a log-in and log-out state via a switchable log-in function at a Voice over Internet Protocol (VoIP) telecommunication service provider via an Internet Protocol (IP) infrastructure consisting of at least one router, wherein the emergency call center has a public Internet Protocol number via which, in the log-out state of the telecommunication device, an emergency call connection diverting to the Voice over Internet Protocol telecommunication service provider is safeguarded between the telecommunication device and the emergency call center.

2. The emergency call system of claim 1, wherein the public Internet Protocol number is stored as emergency call number in the telecommunication device.

3. The emergency call system of claim 1, wherein, when an emergency call coming from the telecommunication device is received, an Internet Protocol number of the telecommunication device is stored in the emergency call center.

4. The emergency call system of claim 3, wherein a call back from the emergency center to the telecommunication device can be initiated by means of the Internet Protocol number of the telecommunication device.

5. The emergency call system of claim 1, wherein a call of the telecommunication terminal at the emergency call center is made without registration of the telecommunication terminal at the emergency call center.

6. The emergency call system as of claim 1, wherein, with the log-in function of the telecommunication device switched on, the emergency call connection diverting to the Voice over Internet Protocol telecommunication service provider forms a connection to a connection existing via the Voice over Internet Protocol telecommunication service provider.

7. The emergency call system as claimed in claim 1, wherein the public Internet Protocol number is a world-wide public Internet Protocol number of an emergency call center which is offering international emergency coverage.

8. The emergency call system as claimed in claim 1, wherein one or more public Internet Protocol numbers of one or more emergency call centers are stored as emergency call number in the telecommunication device.

9. The emergency call system as claimed in claim 1, wherein the emergency call connection diverting to the Voice over Internet Protocol telecommunication service provider is implemented at a router of the Internet Protocol infrastructure.

10. An emergency call system between a telecommunication device and an emergency call center in which the telecommunication device comprises a log-in and log-out state via a switchable log-in function at a Voice over Internet Protocol (VoIP) telecommunication service provider via an Internet Protocol (IP) infrastructure including at least one router, wherein the emergency call center has a public Internet Protocol number via which, in the log-out state of the telecommunication device, an emergency call connection is provided between the telecommunication device and the emergency call center, bypassing the Voice over Internet Protocol telecommunication service provider.

* * * * *